United States Patent [19]

Buchwald et al.

[11] Patent Number: 5,529,618
[45] Date of Patent: Jun. 25, 1996

[54] COMPOSITIONS COMPRISING DIFLUOROMETHOXY-2,2,2-TRIFLUOROETHANE

[75] Inventors: Hans Buchwald, Ronnenberg; Joachim Hellmann, Hanover; Boleslaus Raszkowski, Wiedensahl, all of Germany

[73] Assignee: Solvay Fluor und Derivate GmbH, Hanover, Germany

[21] Appl. No.: 534,334

[22] Filed: Sep. 27, 1995

[30] Foreign Application Priority Data

Oct. 6, 1994 [DE] Germany .......................... 44 35 638.2

[51] Int. Cl.⁶ ..................................................... C09D 7/12
[52] U.S. Cl. ..................................... 106/38.22; 106/38.24; 106/38.25; 106/243; 106/271; 106/285; 106/287.16; 106/287.28; 252/16; 252/29; 252/35; 252/39; 252/54; 264/338
[58] Field of Search ............................ 106/38.22, 38.24, 106/38.25, 243, 271, 285, 287.16, 287.28; 252/16, 29, 35, 39, 54; 264/338

[56] References Cited

U.S. PATENT DOCUMENTS

| | | | |
|---|---|---|---|
| 4,028,120 | 7/1977 | Emond | 106/38.24 |
| 4,995,908 | 2/1991 | Buchwald et al. | 106/38.22 |
| 5,087,285 | 2/1992 | Buchwald et al. | 106/38.22 |
| 5,308,393 | 5/1994 | Hättich et al. | 106/38.22 |
| 5,413,730 | 5/1995 | Barthelemy et al. | 252/171 |

OTHER PUBLICATIONS

Abstract of Published German Patent Document DE 4,006, 688. (Sep. 1991).

*Primary Examiner*—David Brunsman
*Attorney, Agent, or Firm*—Evenson, McKeown, Edwards & Lenahan

[57] ABSTRACT

Liquid or pasty compositions having release-effective properties, which contain difluoromethoxy-2,2,2-trifluoroethane (E245), either alone or admixed with additional solvents, and at least one agent having release-effective properties, and also the use of these compositions and a method for their preparation.

24 Claims, No Drawings

COMPOSITIONS COMPRISING DIFLUOROMETHOXY-2,2,2-TRIFLUOROETHANE

BACKGROUND OF THE INVENTION

The present invention relates to liquid or pasty compositions which contain in particular difluoromethoxy- 2,2,2-trifluoroethane (E245) as solvent and at least one agent having release-effective properties, and also to the use of these compositions and a method for their preparation.

In many industrial fields of use which include operating processes such as casting, molding, pressing, etc. (e.g. for the production and processing of plastics, foamed materials, building materials, rubber articles, tires, metals, glass, ceramic products etc.), it is now required that release agents, lubricants or parting agents be used. As used herein, the term "release agent" refers to a solid or liquid film which reduces the adhesive forces between two adjoining surfaces, i.e. which prevents the surfaces from adhering to each other. The term "lubricant" refers to an additive for plastic compounds, e.g. compression-molding compounds and injection-molding compounds. Lubricant additives are required to make the fillers slide more easily and thus to make the compression-molding compounds easier to deform. The release agents, lubricants or parting agents contain release-effective constituents, e.g. in the form of dry powders, dry films or wet films, pastes, burned-in films, solutions or dispersions. One special form is represented by the so-called internal release-effective components which are mixed into the material which is to be demolded and are either capable of concentrating at the surface of the molded article or which bring about more rapid hardening of the surface, so that there is no bond between the mold wall and the molded article.

Not infrequently in operating processes of the foregoing type, residues of the agent having release-effective properties must be removed from time to time from the mold with the aid of solvents. Typically, solvents such as hydrocarbons and chlorohydrocarbons have been used to clean the molds. However, hydrocarbon solvents are a fire hazard, and chlorohydrocarbon solvents cause skin irritations.

U.S. Pat. No. 4,028,120 discloses a mold release agent for the production of molded rubber products and the shaping of polyurethane foam material. The mold release compound used therein contains paraffin wax, lamp oil and sodium soaps of tall oil acids in a paraffinic base oil. The mold release agent used must be soluble or emulsifiable in water, in order to be able to separate the mold release agent from the molded product by spraying or washing with hot water.

Furthermore, mold release agents are known which contain fluorochlorocarbons as the primary solvent or dispersing agent. For instance, U.S. Pat. No. 4,995,908 describes release agent compositions with 1,1-dichloro2,2,2-trifluoroethane (R123); U.S. Pat. No. 5,087,285 describes release agent compositions with 1,1-dichloro-1fluoroethane, and published German patent application No. DE-OS 4,006,688 discloses release agent compositions with dichloropentafluoropropanes (R225). Despite these many diverse formulations, there is still a need in the art to discover beneficial alternatives suitable for use as release agent compositions.

SUMMARY OF THE INVENTION

It is the object of the invention to provide alternative liquid or pasty compositions of agents having release-effective properties.

Another object of the invention is to provide release agent compositions can be used economically.

A further object of the invention is to provide release agent compositions which can be used without the need to clean the molds or other surfaces on which they are used so frequently.

These and other objects of the invention are achieved by providing a composition consisting essentially of a solvent and 0.1 to 10% by weight, relative to the total composition, of at least one agent having release-effective properties, the solvent being selected from the group consisting of difluoromethoxy-2,2,2-trifluoroethane and mixtures of a major proportion of difluoromethoxy-2,2,2trifluoroethane and a minor proportion of at least one further solvent.

DETAILED DESCRIPTION OF PREFERRED EMBODIMENTS

The present invention provides liquid or pasty compositions having improved properties, containing a solvent and at least one agent having release-effective properties, and optionally additional additives from the group of co-solvents or solubilizers, corrosion inhibitors and stabilizers and consistency regulators which are usual for release agents, with difluoromethoxy-2,2,2-trifluoroethane (E245) being contained as main solvent and the release-effective agent being present in a quantity of 0.1 to 10% by weight, preferably 0.1 to 7% by weight, relative to the total composition (100% by weight). The quantity of E245 in the compositions according to the invention is at least 50% by weight, preferably 50 to 80% by weight, with the remainder to make up to 100% by weight being distributed among the usual additives which may be contained therein.

In preferred compositions according to the invention, the main solvent E245 is present in a mixture with a further solvent. The further solvent (co-solvent) besides E245 in these mixtures may be selected from the group consisting of hydrogen-containing fluorochlorohydrocarbons (HFCHC), hydrogen-containing fluorohydrocarbons (HFHC), fluorohydrocarbons (FHC), chlorohydrocarbons (CHC), nonhalogenated aliphatic hydrocarbons, alcohols, ethers, ketones, etc. With these co-solvents, E245 may also be contained in the compositions according to the invention in the form of an azeotrope-like mixture or as an azeotrope. The co-solvent admixed with E245 serves in particular as a solubilizer for the release-effective agent contained in the compositions according to the invention. The co-solvent or the solubilizer is contained in these preferred compositions in an amount of 10 to 49.9% by weight, preferably of 13 to 49.9% by weight. The percentages in this case relate to the total composition.

Examples of suitable co-solvents include, for example, HFCHCs such as in particular 1,1-dichloro-1-fluoroethane (R141b), 1,1-dichloro-2,2,2-trifluoroethane (R123), tetrachloromonofluoroethane, trichlorodifluoroethane, monochlorohexafluoropropane, dichloropentafluoropropane or mixtures thereof; or HFHCs or FHCs such as in particular 1, 1,1,2-tetrafluoroethane (R 134a), 1,1,1-trifluoroethane (R143a), pentafluoroethane (R125), difluoromethane (R32), 1,1,2-trifluoroethane (R143), trifluoromethane (R23), 1,1 -difluoroethane (R152a), tetrafluoromethane (R14), hexafluoroethane (R116). Particularly suitable conventional hydrocarbons are aliphatic non-halogenated hydrocarbons, e.g. petroleum fractions.

Preferred solubilizers are aliphatic hydrocarbons, preferably petroleum fractions having a boiling range of e.g. 100° to 140° C.

The compositions of the invention are further characterized in that the release-effective agent is selected from the group consisting of waxes, silicones, metallic soaps, synthetic oils and inorganic powders. Waxes are preferred. Optionally, combinations of the release-effective agents also may be used in the compositions according to the invention.

In particular, natural waxes of animal or vegetable origin, preferably natural waxes having a softening point of at least 40° C., are used as waxes within the scope of the invention.

Additional waxes which may be used in the present invention include synthetic waxes, preferably paraffin waxes or polyethylene waxes. In one embodiment, for instance, an oxidized polyethylene wax having an average molecular weight of 3,700 to 4,500 (viscosimetric), an acid number of 20 to 30, and a melting point of 89° to 99° C. is used.

Another type of composition according to the invention contains silicones. The silicones used may be in the form of oils, greases or resins, which are commercially available. Such silicones can be used as such or in the form of silicone emulsions which optionally additionally contain a consistency regulator (e.g. highly-disperse silicic acid) incorporated into the silicone oil, or in the form of silicone pastes which usually contain metallic soaps as consistency regulators.

One variant of the invention is characterized in that the compositions contain metallic soaps, for instance fatty-acid salts of the metals magnesium, calcium, zinc, aluminum or lead. Optionally the metal salts of stearic acid are used, in which case magnesium stearate is then preferred.

A further variant of compositions within the scope of the invention contains inorganic powders, preferably graphite, talcum or mica. Furthermore, other conventional agents having release-effective properties, such as synthetic oils, e.g. ester oils, may also be used in compositions according to the invention.

Provision may additionally be made to add up to 1% by weight of known corrosion inhibitors to the compositions according to the invention. Such corrosion inhibitors for metals such as magnesium, aluminum, titanium, brass, bronze and steel are commercially available. For the most part, they are based on compositions which contain organic compounds with hetero atoms such as sulfur or, in particular, nitrogen. For instance, individual compounds or mixtures of compounds selected from the group consisting of benzothiazoles, e.g. mercaptobenzothiazole; benzimidazoles, e.g. 2-phenylbenzimidazole; triazoles, e.g. benzotriazoles or tolytriazoles; oxazolines, e.g. alkyl-substituted and/or hydroxyalkyl-substituted oxazolines; amides; amines, e.g. tertiary amines, have proved suitable. Furthermore, conventional stabilizers may optionally be added to the compositions according to the invention. Furthermore, they may contain consistency-regulating additives.

The compositions according to the invention are either in the form of dispersions or pastes. As used herein, the term "dispersions" is understood to include both emulsions and suspensions.

The invention also relates to the use of the compositions according to the invention as release agents, lubricants or parting agents, for instance in the production of plastic (i.e. synthetic resin) materials or foam materials, or in other fields of use.

Furthermore, the invention relates to a method for the preparation of the compositions according to the invention, in which one or more agents having release-effective properties in a quantity of 0.1 to 10% by weight, preferably 0.1 to 7% by weight, relative to the total mixture, is incorporated into the solvent E245 or into a solvent mixture containing E245. Optionally, at the same time conventional solubilizers and/or other additives such as stabilizers, corrosion inhibitors and consistency regulators may be added.

The compositions according to the invention with E245 as main solvent have improved adhesion-reducing properties, high chemical inertness and good spreading ability. Compared with conventional release agents in which hydrocarbons are used as solvents, the compositions according to the invention have a higher flash point. Furthermore, the use of the compositions according to the invention instead of conventional release agent compositions is more economical, since less release agent composition is consumed for the same application. Additional advantages are displayed over longer-term use of the molds, for instance in that the molds used need to be cleaned less frequently between operations.

The invention will be described in further detail by the following examples which are to be considered illustrative and are not limiting on the scope of the invention.

EXAMPLE 1

A composition according to the invention was produced from 6% by weight polyethylene wax (melting point 89°–99° C.) and 80% by weight difluoromethoxy-2,2,2-trifluoroethane (E245) and also 14% by weight hydrocarbon (petroleum fraction 100°–140° C.). The composition was a dispersion and had excellent release-effective properties.

EXAMPLES 2 to 6:

Further Examples 2 to 6 of compositions according to the invention, the constituents of which are listed in the following table, were produced in a manner similar to Example 1. The compositions of Examples 2 through 6 likewise exhibited excellent release-effective properties. The constituents are given in % by weight.

| Constituents of the composition | Example | | | | |
|---|---|---|---|---|---|
| | 2 | 3 | 4 | 5 | 6 |
| E-245 | 99.9 | 80 | 76 | 50 | 50 |
| Silicone oil (20,000 m²/s) | 0.1 | | | | |
| Paraffin (melting point 56–58° C.) | | | | | 4 |
| Polyethylene wax (melting point 89–99° C.) | | | | 10 | |
| Polyethylene wax (melting point 98–108° C.) | | 4 | 5 | | |
| Magnesium stearate | | | 1 | | |
| Petroleum fraction 100–140° C. | | 16 | 18 | 40 | 46 |
| | D* | D | D | P | D |

D = dispersion; P = paste;
*(The dispersion showed a slight, reversible settling behavior; a perfectly satisfactory dispersion could be reobtained at any time by shaking lightly.)

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A composition consisting essentially of a solvent and 0.1 to 10% by weight, relative to the total composition, of at least one agent having release-effective properties, wherein said solvent is selected from the group consisting of difluoromethoxy-2,2,2-trifluoroethane and mixtures of a major proportion of difluoromethoxy-2,2,2-trifluoroethane and a minor proportion of at least one further solvent.

2. A composition according to claim 1, which further contains at least one additional conventional constituent for release agent compositions, said additional constituent being selected from the group consisting of co-solvents, solubilizers, corrosion inhibitors, stabilizers and consistency regulators.

3. A composition according to claim 1, wherein said composition contains 0.1 to 7% by weight of said agent having release-effective properties, relative to the weight of the total composition.

4. A composition according to claim 1, wherein said composition is a liquid.

5. A composition according to claim 1, wherein said composition is a pasty composition.

6. A composition according to claim 1, wherein the release-effective agent is selected from the group consisting of waxes, silicones, metallic soaps, synthetic oils and inorganic powders.

7. A composition according to claim 6, wherein the release-effective agent comprises a metallic soap.

8. A composition according to claim 7, wherein the metallic soap is a fatty acid salt of a metal selected from the group consisting of magnesium, calcium, zinc, aluminum, and lead.

9. A composition according to claim 8, wherein the metallic soap is a salt of stearic acid.

10. A composition according to claim 1, wherein the release-effective agent is a wax.

11. A composition according to claim 10, wherein the wax is a natural wax of animal or vegetable origin.

12. A composition according to claim 11, wherein the wax is a natural wax having a softening point of at least 40° C.

13. A composition according to claim 10, wherein the wax is a synthetic wax.

14. A composition according to claim 13, wherein the synthetic wax is a paraffin wax or a polyethylene wax.

15. A composition according to claim 1, wherein the release-effective agent comprises an inorganic powder selected from the group consisting of graphite, talcum and mica.

16. A composition according to claim 1, containing from 1 to 50% by weight of a conventional solubilizer, relative to the weight of the total composition.

17. A composition according to claim 16, containing from 10 to 30% by weight of a conventional solubilizer, relative to the weight of the total composition.

18. A composition according to claim 16, wherein said solubilizer comprises aliphatic hydrocarbons.

19. A composition according to claim 18, wherein said solubilizer is a petroleum fraction having a boiling range of from 100° to 140° C.

20. A method of inhibiting adhesion of a formed article to a form used to produce it, said method comprising applying a composition according to claim 1, to said form prior to producing the formed article.

21. A method of producing a composition according to claim 1, comprising incorporating 0.1 to 10% by weight, relative to the weight of the total composition, of at least one agent having release-effective properties into a solvent principally comprising difluoromethoxy-2,2,2-trifluoroethane.

22. A method according to claim 21, wherein said solvent consists of difluoromethoxy-2,2,2-trifluoroethane.

23. A method according to claim 21, wherein 0.1 to 7% by weight, relative to the weight of the total composition, of said at least one agent having release-effective properties are incorporated into said solvent.

24. A method according to claim 21, wherein at least one additional conventional constituent for release agent compositions selected from the group consisting of co-solvents, solubilizers, corrosion inhibitors, stabilizers and consistency regulators is incorporated into said composition.

\* \* \* \* \*